United States Patent [19]
Simon

[11] 3,809,798
[45] May 7, 1974

[54] ANGLE TYPE FEEDTHROUGH CABLE CLAMP

[76] Inventor: Hans Simon, Bruchhausener Strasse, 5463 Unkel (Rhine), Germany

[22] Filed: Sept. 6, 1972

[21] Appl. No.: 286,842

[52] U.S. Cl................ 174/59, 174/65 R, 174/135, 248/56, 310/71
[51] Int. Cl. ........................ H02g 3/02, H02g 3/22
[58] Field of Search ..... 174/48, 51, 59, 65 R, 65 G, 174/135, 138 R, 138 F, 153 G; 248/56; 310/71; 339/44, 107

[56] References Cited
UNITED STATES PATENTS
2,686,828  8/1954  Guy et al. ......................... 174/65 R
3,518,616  6/1970  Lewis.............................. 310/17 X Primary Examiner—Laramie E. Askin
Attorney, Agent, or Firm—Flynn & Frishauf

[57] ABSTRACT

A cable clamp adapted to be made of one piece of synthetic material has a base bearing a feedthrough hole for placing in registry with a knock-out hole in an appliance housing and has a clamp seat onto which the cable issuing out of the hole is bent. A cover connected to the base with a live hinge bears the upper jaw of the clamp and is adapted to be fastened onto the clamp seat and base by screws. The feedthrough opening in the base has a semi-circular flange protruding through the corresponding opening in the appliance housing. The flange has a lip for engaging the rear surface of the housing.

7 Claims, 9 Drawing Figures

ANGLE TYPE FEEDTHROUGH CABLE CLAMP

This invention relates to a clamp for angle type lead-in of cable to an electric machine or appliance in which the cable is sharply bent over at the lead-in point. Such angle type lead-ins usually involve a 90° bend but other angles may be required, for example an angle smaller than 90°. The cable clamp of this invention is particularly suited for electrical household appliances.

Cable clamps and cable feedthroughs of a wide variety of forms are known. In these cases either the cable is held fast in the axial direction in the lead-in opening (cone clamps and cone-like screw fastenings), or else the cable is fastened with a surface type clamp to a housing in the neightborhood of the lead-in opening. In still other cases angle type screw fastenings have been provided of relatively complicated construction with, in consequence, relatively difficult assembly, so that up to now they have not been adopted for the usual electrical appliances.

It is the object of this invention to provide a clamp for bent over cable lead-in to electrical machines and appliances that meets all requirements with a simple construction and an inexpensive mode of production.

Subject matter of the present invention

Briefly, cable clamps of this invention comprise a base plate, adapted to be fastened to the equipment, provided with a cable feedthrough opening and a clamping seat for the bent over cable. Integral with the base plate and connected to it by a flexible web forming what is known as a "live hinge" a cover is provided, adapted to be fastened down with suitable fasteners, such as machine screws, to clamp the cable against the clamping seat carried by the base plate. As a further convenience, at the feedthrough opening of the base plate is a flange at least a part of which extends through a corresponding opening in the housing of the appliance in question. This flange extends around not more than half the periphery of that corresponding opening and is provided, on the portion extending through the opening, with a lip adapted to catch or engage the housing from behind, that is, from inside. The member just described, extending through the corresponding opening in the housing, serves partly as additional insulation for the cable with respect to the housing, which is usually of metal, and also, on account of the lip reaching around the edge of the opening in the housing, serves for positioning or fixing the base plate. When this flange is introduced into the knock-out opening of a housing and has its lip hooked in behind the edge of that opening, it is then in practice sufficient to fasten the base plate with only a single screw in order to hold it absolutely fast to the equipment. The flange of the base plate sticking through the opening in the equipment housing can appropriately be semi-circular and the lip-formed on its extremity preferably has its greatest extension at the middle or crown of the flange and runs out as it approaches the end of the semi-circular flange. In this manner all difficulties of inserting the flange through the lead-in opening of the housing are avoided.

The feedthrough opening in the base plate can of course also be open to the edge of the base plate. The semi-circular flange arranged in the cable feedthrough opening is then preferably located on the side of the opening away from the base plate edge, so that in this form of construction according to the invention a pulling through of the cable through the lead-in opening in the base plate is avoided. In this particular case a semi-circular wall formed on the cover and adapted to intrude into this feedthrough opening in the closed condition of the device can close off the open-ended cable feedthrough opening and provide the necessary edge protection to the base plate.

In accordance with an advantageous form of embodiment of the present invention the clamping seat or other holding means provided on the base plate is in the form of the lower jaw of a cable clamp and the upper jaw coordinated thereto is formed integral with the cover. After the cover is folded over the rest of the structure, the upper jaw of the cable clamp can effectively be pressed fast on the lower jaw with two screws. These screws can conveniently be screwed into metallic nuts embedded in the lower jaw of the clamp. They can be press fitted or molded into the lower jaw in manufacture. These two clamp screws can at the same time fasten the cover down onto the base plate. The cover can be made integrally with the base plate and joined to it by a live hinge; and if the upper jaw of the clamp is separate from the cover, each can be made integral with the base plate, connected, for example, by live hinges on opposite sides of the base plate.

Walls spacing the cover from the base plate, which may conveniently be referred to as upstanding walls, are preferably provided on the base plate and may conveniently be provided on the cover as well. A terminal strip may be provided between the holding means or clamp seat and the feedthrough opening. The upstanding walls may also be provided with an opening to bring out a grounding wire to a terminal on the outside of the equipment housing.

Illustrative embodiments of the invention are described below with reference to the accompanying drawings, in which:

FIG. 1 is a perspective partly exploded view of an angle type clamp according to the invention in opened condition;

FIG. 2, also in perspective, shows the clamp of FIG. 1, still in open position, with a cable fed therethrough;

FIG. 3, likewise in perspective, shows the clamp of FIG. 1 and FIG. 2 in closed position with a cable fed therethrough, with fastening means exploded;

FIG. 4, likewise in perspective, shows a different embodiment of the invention, in open position, with a cable fed therethrough;

FIG. 5 shows the clamp of FIG. 4 with the upper clamp jaw holding the cable fast on the lower clamp jaw;

FIG. 6, likewise in perspective, shows the clamp of FIGS. 4 and 5, the cover closed and fastened down;

Figure 1:
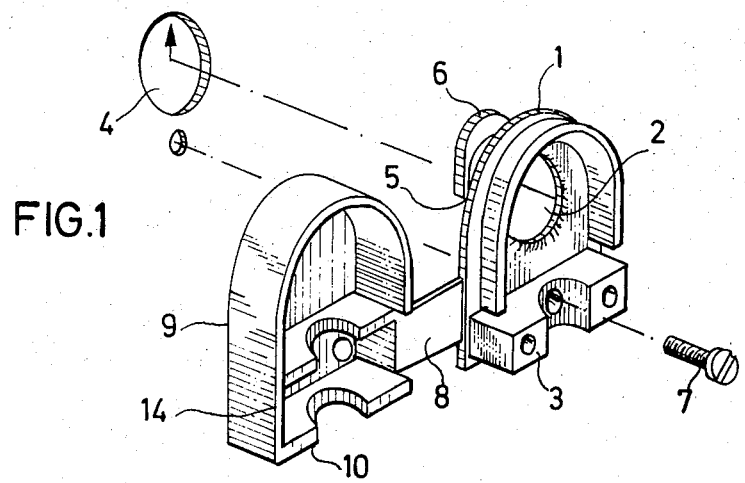
Figure 2:
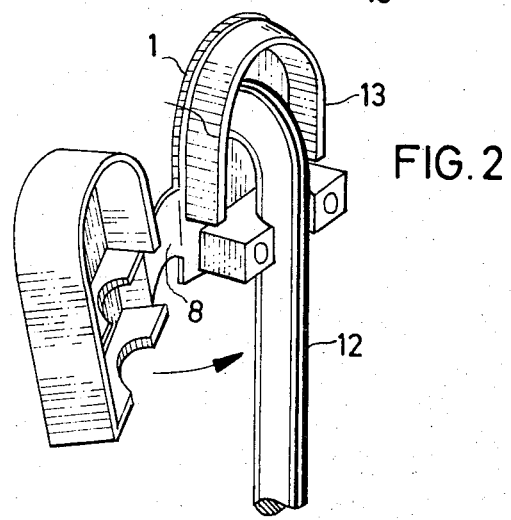
Figure 3:
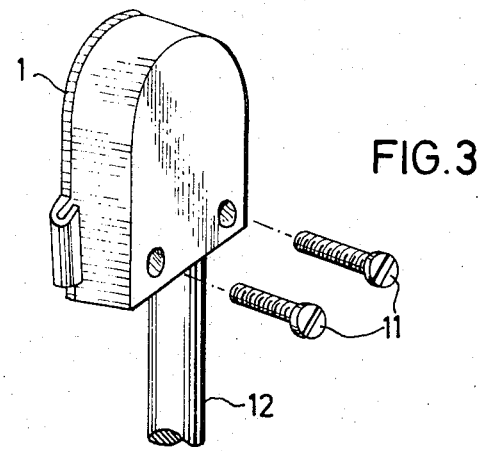

The clamp shown in FIGS. 1, 2 and 3 comprises a base plate 1 which is provided with a cable feedthrough opening 2 and a holding means 3 in the form of a clamping seat. The cable feedthrough opening has a semi-circular wall or flange 5 extending into the opening 4, which in FIG. 1 is shown shifted over to the left so that the form of the flange 5 can be shown. The opening 4 is, for example, the lead-in opening, usually in the form of a knock-out, in a housing of an electrical machine or appliance through which the power cord for the device passes. The flange 5 has a lip 6 adapted to engage the housing from behind.

The holding means 3 is in the form of the lower jaw of a clamp mounted on the base plate 1 and held in position together with the base plate by the screw 7.

The cover 9 is made integral with the base plate 1, being joined thereto by a strap or web 8 which forms what is commonly called a "live hinge." The cover 9 also provides the upper half 10 of the cable clamp. The hinge-like connecting strap 8 allows the cover to be closed over the lower jaw of the clamp, after which the two screws 11 are used not only to fasten the cover, but also to press the upper jaw on the lower jaw of the clamp so that the cable 12 (FIG. 2 and FIG. 3) which is fed through the base plate before applying the cover will be securely held.

The base plate 1 is provided with an upstanding peripheral wall 13 which in this case is set inwards a little from the edge of base plate 1 so that the peripheral wall 14 similarly provided on the cover 9 can rest against the base plate when the screws 11 are tightened. In this manner the bent portion of the cable is protected against pressure or impact and the feedthrough opening is protected against the intrusion of foreign matter. The provision of the two walls respectively on the base plate and on the cover and the setback of the former assures firm positioning of the cover. The setback preferably is equal to the thickness of the edge wall of the cover. In this manner the cover is pressed rather against the base plate itself than against the upstanding wall 13 formed on the base plate.

Figure 4:
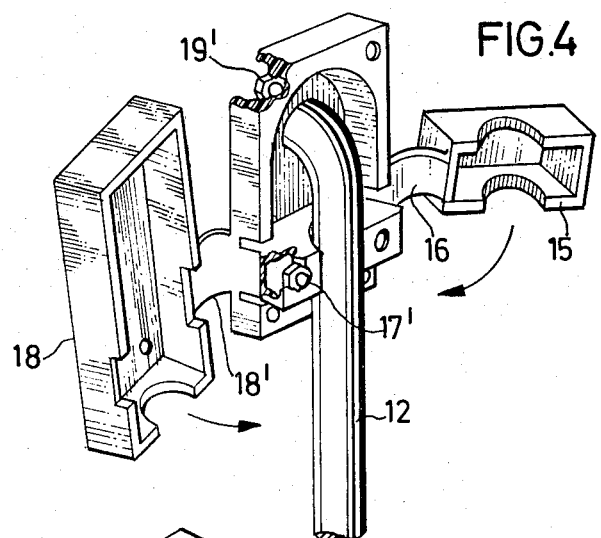
Figure 5:
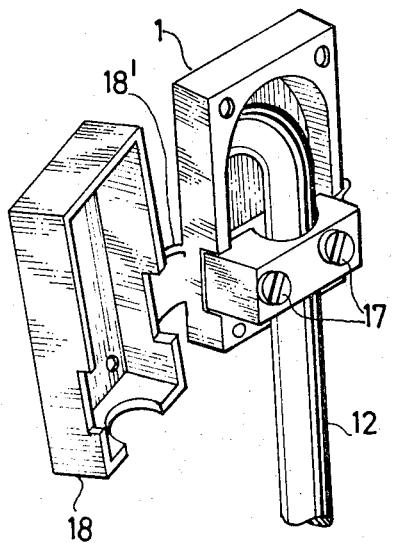
Figure 6:
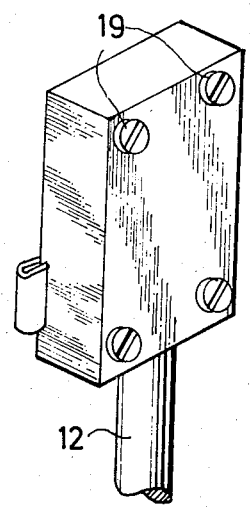

A different form of clamp embodying the invention is shown in FIGS. 4, 5 and 6. In this case the upper jaw 15 of the cable clamp is connected to the base plate by a live hinge 16 and accordingly may be made integral with the base plate. After the upper jaw 15 is pressed against the cable and closed over the lower jaw, the screws 17 are tightened to clamp the cable fast in place. The cover 18 is connected to the base plate by its own live hinge 18'. After the cable is clamped, the cover 18 is folded over in place and fastened by the screws 19. In this case the edge wall of the base plate is not set back and is thick enough at the corners to hold threaded holes for the screws 19. FIG. 4 shows portions of the clamp broken away in order to illustrate the presence of the nuts 17' and 19' which serve to receive screws 17 and 19 respectively.

The cover 18 is preferably made moisture-tight by suitable moisture proofing means.

Figure 7:
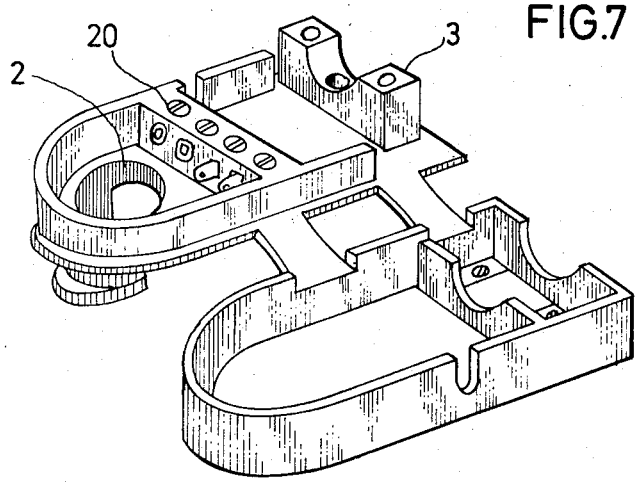
FIG. 7 shows, in open position, still another embodiment of the invention.
Figure 8:
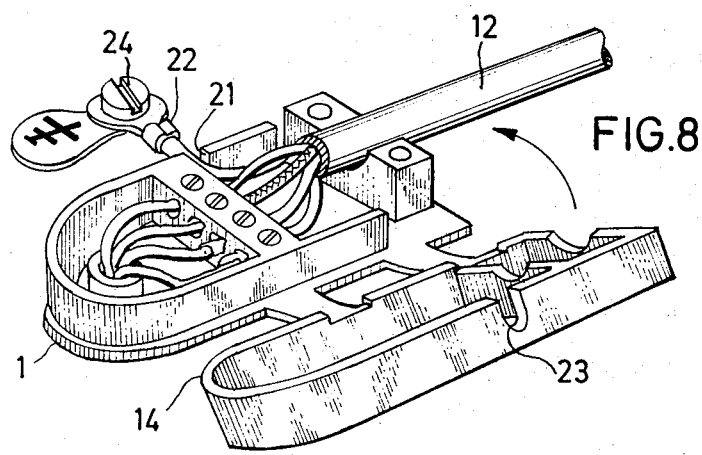
FIG. 8 shows, likewise in perspective, the cable clamp of FIG. 7 still in open position with a cable therein connected to its terminal strip and a ground wire brought out to a grounding screw.

Still another form of cable clamps embodying the invention is shown in FIGS. 7 and 8. In this case a terminal strip 20 provided on the base plate between the holding means 3 and the feedthrough opening 2. This form of clamp is particularly useful in the case of electrical appliances which are produced or delivered without an electrical power cord. The terminal strip, or terminal board as it is sometimes called, may have sufficient terminals to permit some branching of the electrical supply, or for two or three phase connections. In power connections of this sort it is important to provide for grounding of the housing or casing of the appliance or machine. An opening 21 is accordingly made in the edge wall of the base plate through which a ground wire 22 may pass for termination at a nearby grounding screw 24. A corresponding opening 23 is provided in the edge wall 14 of the cover.

This form of grounding connection has the advantage of being direct and visible and, furthermore, in this type of arrangement the grounding conductor will hold its connection longer than the current carrying conductors in the event an unexpectedly strong pull on the power cord pulls the current carrying wires out of the terminal strip or breaks them off, in which case the ground wire will remain connected or will break last, thus providing a definite improvement for electrical safety of the appliance.

Figure 9:
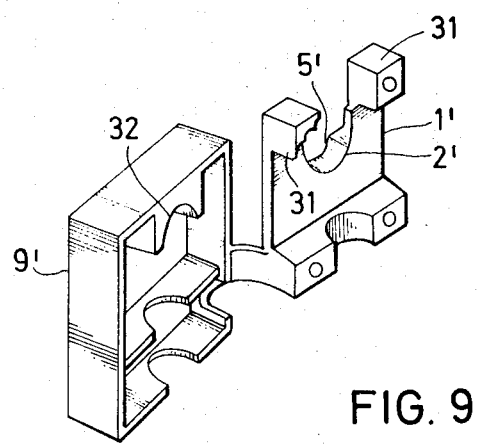
FIG. 9 shows, still in perspective, still another form of cable clamp embodying the invention.

FIG. 9 shows a form of cable clamp according to the invention in which the feedthrough opening is open to the edge of the base plate so that the cable does not have to be pulled through the cable clamp. In this case the opening in question is the U-shaped opening 2' formed in the base plate 1'. As previously explained in such a case the semi-circular flange 5' must be on the side of the opening opposite to the edge of the base plate into which the opening is opened, hence the bottom of the U.

In FIG. 9 the base plate has bosses 31 to hold the threaded recesses for receiving screws corresponding to screws 19, of FIG. 6. The upper left-hand boss 31 is broken away to show the position of flange 5'.

Cover 9' carries a semi-circular member 32 to close off the open end of U-shaped opening 2' when the cover is placed over the base plate in position for clamping the cable.

The construction of all parts of the clamp of this invention in one piece, as illustrated in the various embodiments above described, is easy and economic to produce in practice out of synthetic material, such as thermosetting or thermoplastic synthetic resin materials.

Although the cable clamp of this invention has been described with reference to particular illustrative embodiments, it will be understood that various forms of the invention can be devised without departing from its principles.

I claim:

1. A clamp for a bent over cable lead-in to an electrical device of the class including electrical machines and electrical appliances, comprising:

a base plate having a feedthrough opening therein provided with a flange at least part of which is disposed for extending through a corresponding opening of the housing of said electrical device, said flange being disposed for extending around not more than half of the periphery of said corresponding opening, the portion of said flange disposed for extending through said corresponding opening bearing a lip adapted to engage said housing from behind;

holding means affixed to said base plate adapted to hold a cable passing through said feedthrough opening and bent over into approximate parallelism with said base plate when said cable is pressed against said means, said holding means constituting the lower jaw of a cable clamp;

an upper jaw coordinated with said lower jaw and connected to said base plate and adapted to be folded over onto said lower jaw and tightened thereagainst to clamp said cable;

a cover, adapted to cover the bent portion of said cable;

live hinge means flexibly uniting said cover and said upper jaw to said base plate, said live hinge means being adapted to permit said cover and said upper jaw to be folded against said base plate and said cable, and fastening means for fastening said base plate to said housing of said electrical device and for fastening said cover in position over said bent portion of said cable.

2. A clamp as defined in claim 1 in which said base plate is provided with an at least partial upstanding peripheral wall against which said cover is adapted to be positioned.

3. A clamp as defined in claim 2 in which said cover is at least partially provided with an upstanding peripheral wall adapted to enclose said base plate when said cover is folded over onto said base plate.

4. A clamp as defined in claim 3 in which a terminal strip is provided on said base plate.

5. A clamp as defined in claim 3 in which said upstanding peripheral wall of said base plate is set inward from the edge of said base plate by the thickness of said upstanding peripheral wall of said cover.

6. A clamp as defined in claim 5 in which an opening is provided through said upstanding peripheral walls of said base plate and of said cover adapted for passing a grounding conductor therethrough.

7. A clamp as defined in claim 1 made of a synthetic resin material which is flexible in thin unribbed sheets and likewise in thin strips, but substantially rigid in boxed molded shapes and likewise rigid in block molded shapes.

* * * * *